(12) United States Patent
Higashino et al.

(10) Patent No.: US 10,734,665 B2
(45) Date of Patent: Aug. 4, 2020

(54) METHOD FOR PRODUCING CELL STRUCTURE

(71) Applicants: SUMITOMO ELECTRIC INDUSTRIES, LTD., Osaka-shi, Osaka (JP); KYOTO UNIVERSITY, Kyoto-shi, Kyoto (JP)

(72) Inventors: Takahiro Higashino, Itami (JP); Kazunari Miyamoto, Itami (JP); Yohei Noda, Itami (JP); Chihiro Hiraiwa, Itami (JP); Naho Mizuhara, Itami (JP); Hiromasa Tawarayama, Itami (JP); Hisao Takeuchi, Itami (JP); Masatoshi Majima, Itami (JP); Tetsuya Uda, Kyoto (JP); Donglin Han, Kyoto (JP)

(73) Assignees: SUMITOMO ELECTRIC INDUSTRIES, LTD., Osaka-shi, Osaka (JP); KYOTO UNIVERSITY, Kyoto-shi, Kyoto (JP)

( * ) Notice: Subject to any disclaimer, the term of this patent is extended or adjusted under 35 U.S.C. 154(b) by 0 days.

(21) Appl. No.: 15/752,389

(22) PCT Filed: Aug. 5, 2016

(86) PCT No.: PCT/JP2016/073132
§ 371 (c)(1),
(2) Date: Feb. 13, 2018

(87) PCT Pub. No.: WO2017/030023
PCT Pub. Date: Feb. 23, 2017

(65) Prior Publication Data
US 2019/0006692 A1    Jan. 3, 2019

(30) Foreign Application Priority Data

Aug. 17, 2015  (JP) .................................. 2015-160692

(51) Int. Cl.
*B32B 18/00* (2006.01)
*C04B 35/488* (2006.01)
(Continued)

(52) U.S. Cl.
CPC ........... *H01M 8/1253* (2013.01); *B32B 18/00* (2013.01); *C04B 35/488* (2013.01); *C04B 35/50* (2013.01);
(Continued)

(58) Field of Classification Search
None
See application file for complete search history.

(56) References Cited

U.S. PATENT DOCUMENTS

2001/0029231 A1* 10/2001 Gorte .................. H01M 4/8885
502/101
2016/0204446 A1    7/2016 Higashino et al.

FOREIGN PATENT DOCUMENTS

JP    2001-307546 A    11/2001
JP    2006-139960 A    6/2006
(Continued)

OTHER PUBLICATIONS

Shimada, Hiroyuki & Takami, Eiji & Takizawa, Koichi & Hagiwara, Akifusa & Ihara, Manabu. (2011). Highly dispersed anodes for solid oxide fuel cells using NiO/YSZ/BZY triple-phase composite powders prepared by spray pyrolysis. Solid State Ionics. 193. 43-51. 10.1016/j.ssi.2011.04.010.*
(Continued)

*Primary Examiner* — Ula C Ruddock
*Assistant Examiner* — Amanda Rosenbaum
(74) *Attorney, Agent, or Firm* — Faegre Drinker Biddle & Reath LLP

(57) ABSTRACT

A method for producing a cell structure includes: a step of firing a laminated body of a layer containing an anode
(Continued)

material and a layer containing a solid electrolyte material, to obtain a joined body of an anode and a solid electrolyte layer; a step of laminating a layer containing a cathode material on a surface of the solid electrolyte layer, and firing the obtained laminated body to obtain a cathode. The anode material contains a metal oxide Ma1 and a nickel compound. The metal oxide Ma1 is a metal oxide having a perovskite structure represented by $A1_{x1}B1_{1-y1}M1_{y1}O_{3-\delta}$ (wherein: A1 is at least one of Ba, Ca, and Sr; B1 is at least one of Ce and Zr; M1 is at least one of Y, Yb, Er, Ho, Tm, Gd, In, and Sc; $0.85 \leq x1 \leq 0.99$; $0 < y1 \leq 0.5$; and $\delta$ is an oxygen deficiency amount).

3 Claims, 1 Drawing Sheet

(51) Int. Cl.
```
C04B 35/50      (2006.01)
C04B 35/505     (2006.01)
C04B 35/626     (2006.01)
C04B 35/634     (2006.01)
C04B 35/636     (2006.01)
C04B 35/638     (2006.01)
H01M 8/1253     (2016.01)
H01M 4/90       (2006.01)
H01M 8/1213     (2016.01)
H01M 8/0258     (2016.01)
H01M 8/124      (2016.01)
```
(52) U.S. Cl.
CPC ........ *C04B 35/505* (2013.01); *C04B 35/6262* (2013.01); *C04B 35/638* (2013.01); *C04B 35/6365* (2013.01); *C04B 35/63416* (2013.01); *H01M 4/9033* (2013.01); *H01M 8/1213* (2013.01); *C04B 2235/3208* (2013.01); *C04B 2235/3213* (2013.01); *C04B 2235/3215* (2013.01); *C04B 2235/3224* (2013.01); *C04B 2235/3227* (2013.01); *C04B 2235/3229* (2013.01); *C04B 2235/3279* (2013.01); *C04B 2235/656* (2013.01); *C04B 2235/768* (2013.01); *C04B 2235/80* (2013.01); *C04B 2237/34* (2013.01); *H01M 8/0258* (2013.01); *H01M 2008/1293* (2013.01); *H01M 2300/0077* (2013.01); *Y02P 70/56* (2015.11)

(56) References Cited

FOREIGN PATENT DOCUMENTS

| JP | 2007-197315 A | 8/2007 |
| JP | 2010-102959 A | 5/2010 |
| JP | 201-046251 A | 3/2015 |
| JP | 2015-76129 A | 4/2015 |
| WO | WO-2012/036057 A1 | 3/2012 |

OTHER PUBLICATIONS

NIMS team develops promising IT-SOFC electrolyte materials, Fuel Cells Bulletin, vol. 2011, Issue 2, 2011.*
M. Ihara, T. Kusano, C. Yokoyama, J. Electrochem. Soc. 148 (2001) A209.*
Shimada, et al. Highly dispersed anodes for solid oxide fuel cells using NiO/YSZ/BZY triple-phase composite powders prepared by spray pyrolysis. Solid State Ionics. 193. 43-51. 10.1016/j.ssi.2011.04.010. (Year: 2011).*
NIMS team develops promising IT-SOFC electrolyte materials, Fuel Cells Bulletin, vol. 2011, Issue 2, 2011 (Year: 2011).*
Shimada, Hiroyuki, et al. "Electrochemical Behaviors of Nickel/Yttria-Stabilized Zirconia Anodes with Distribution Controlled Yttrium-Doped Barium Zirconate by Ink-Jet Technique." Journal of the Electrochemical Society, vol. 159, No. 7, 2012, doi:10.1149/2.068207jes. (Year: 2012).*
M. Ihara, T. Kusano, C. Yokoyama, J. Electrochem. Soc. 148 (2001) A209. (Year: 2001).*
Guo, Youmin, et al. "Zirconium Doping Effect on the Performance of Proton-Conducting BaZryCe0.8-yY0.2O3-δ (0.0≤y≤0.8) for Fuel Cell Applications." Journal of Power Sources, vol. 193, No. 2, 2009, pp. 400-407., doi:10.1016/j.jpowsour.2009.03.044. (Year: 2009).*
Fang, Shumin, et al., "Relationship between fabrication method and chemical stability of Ni—BaZr$_{0.8}$Y$_{0.2}$O$_{3-\delta}$ membrane," Journal of Power Sources, 278 (2015) pp. 614-622.
International Search Report dated Oct. 25, 2018 for PCT/JP2016/073132.
Yeong Yoo et al., "Performance and stability of proton conducting solid oxide fuel cells based on yttrium-doped barium cerate-zirconate thin-film electrolyte," Journal of Power Sources, vol. 229 (2013) pp. 48-57.
Guilin Ma et al., "Ionic conduction and nonstoichiometry in BaxCe090Y01003-a," Solid State Ionics, vol. 110 (1998) pp. 103-110.
Monica V. Sandoval et al., "Barium-modified NiO-Ysz/NiO-Gdc cermet as new anode material for solid oxide fuel cells (Sofc)," Solid State Ionics, vol. 261 (2014) pp. 36-44.

* cited by examiner

METHOD FOR PRODUCING CELL STRUCTURE

TECHNICAL FIELD

The present invention relates to a method for producing a cell structure. This application claims priority on Japanese Patent Application No. 2015-160692 filed on Aug. 17, 2015, the entire contents of which are incorporated herein by reference.

BACKGROUND ART

PATENT LITERATURE 1 and 2 disclose using, as an ion conductor of a fuel cell, a perovskite type oxide such as barium zirconate doped with yttrium (hereinafter, referred to as "BZY"), barium cerate doped with yttrium, and a mixed oxide of barium zirconate/barium cerate doped with yttrium.

NON PATENT LITERATURE 1 states that $BaY_2NiO_5$ is generated as a by-product in the case where an anode of a fuel cell is formed by sintering the BZY and nickel oxide. Furthermore, NON PATENT LITERATURE 1 states that the $BaY_2NiO_5$ decomposes in an atmosphere containing water, carbon dioxide, or hydrogen, to generate decomposition products such as barium hydroxide [$Ba(OH)_2$] and barium carbonate [$BaCO_3$].

CITATION LIST

Patent Literature

PATENT LITERATURE 1: Japanese Laid-Open Patent Publication No. 2001-307546
PATENT LITERATURE 2: Japanese Laid-Open Patent Publication No. 2007-197315

Non Patent Literature

NON PATENT LITERATURE 1: Journal of Power Sources, 278 (2015) 614-622

SUMMARY OF INVENTION

One aspect of the present disclosure is directed to a method for producing a cell structure, the method including: a first step of preparing a cathode material, a solid electrolyte material having proton conductivity, and an anode material; a second step of laminating a layer containing the anode material and a layer containing the solid electrolyte material to obtain a first laminated body, and firing the obtained laminated body to form a joined body of an anode and a solid electrolyte layer; and a third step of laminating a layer containing the cathode material on a surface of the solid electrolyte layer to obtain a second laminated body, and firing the obtained second laminated body to form a cathode, wherein the anode material contains a metal oxide Ma1 and a nickel compound, the metal oxide Ma1 contains an element A1, an element B1, an element M1, and oxygen as constituent elements, and the metal oxide Ma1 is a metal oxide having a perovskite structure represented by formula (I):

$$Al_{x1}B1_{1-y1}M1_{y1}O_{3-\delta} \quad (I)$$

(wherein: A1 is at least one element selected from the group consisting of barium, calcium, and strontium; B1 is at least one element selected from the group consisting of cerium and zirconium; M1 is at least one element selected from the group consisting of yttrium, ytterbium, erbium, holmium, thulium, gadolinium, indium, and scandium; x1 is a number that satisfies $0.85 \leq x1 \leq 0.99$; y1 is a number that satisfies $0 \leq y1 \leq 0.5$; and $\delta$ is an oxygen deficiency amount).

Another aspect of the present disclosure is directed to a method for producing a cell structure, the method including: a first step of preparing a cathode material, a solid electrolyte material having proton conductivity, and an anode material; a second step of laminating a layer containing the anode material and a layer containing the solid electrolyte material to obtain a first laminated body, and firing the obtained first laminated body to form a joined body of an anode and a solid electrolyte layer; and a third step of laminating a layer containing the cathode material on a surface of the solid electrolyte layer to obtain a second laminated body, and firing the obtained second laminated body to form a cathode, wherein the anode material contains a metal oxide Ma2, a compound Ma3, and a nickel compound, the metal oxide Ma2 contains an element A1, an element B1, an element M1, and oxygen as constituent elements, the metal oxide Ma2 is a metal oxide having a perovskite structure represented by formula (II):

$$Al_{x2}B1_{1-y2}M1_{y2}O_{3-\delta} \quad (II)$$

(wherein: A1 is at least one element selected from the group consisting of barium, calcium, and strontium; B1 is at least one element selected from the group consisting of cerium and zirconium; M1 is at least one element selected from the group consisting of yttrium, ytterbium, erbium, holmium, thulium, gadolinium, indium, and scandium; x2 is a number that satisfies $0.99 \leq x2 \leq 1$; y2 is a number that satisfies $0 < y2 \leq 0.5$; and $\delta$ is an oxygen deficiency amount), and the compound Ma3 does not contain the element A1 and contains at least one of the element B1 and the element M1.

DESCRIPTION OF EMBODIMENTS

Problems to be Solved by Disclosure

Figure 1:
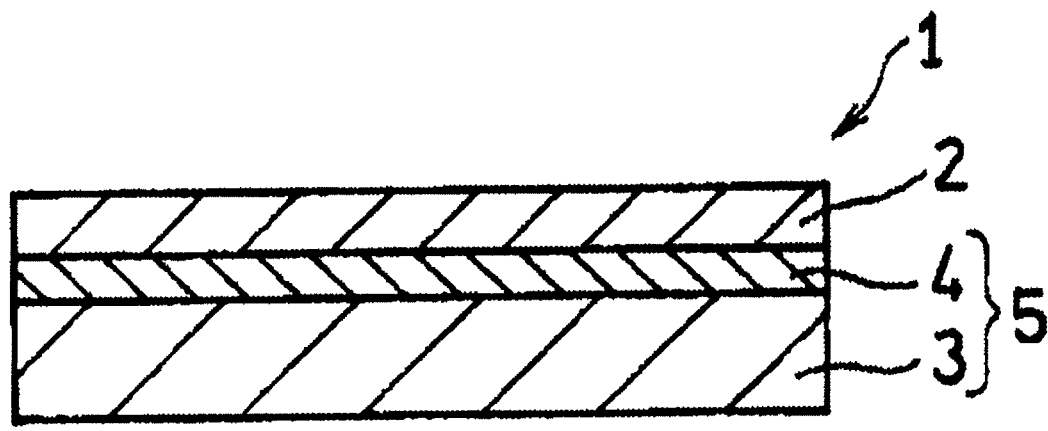
FIG. 1 is a cross-sectional view schematically showing a cell structure according to an embodiment of the present invention.

According to study by the present inventors, it has been found that oxidation-reduction reaction in a cell structure may be limited, since decomposition products such as barium hydroxide [$Ba(OH)_2$] and barium carbonate [$BaCO_3$] block voids of an anode and a cathode thereby to decrease a three-phase interface.

Therefore, the present invention includes providing a method for producing a cell structure that can inhibit a decrease in the efficiency of oxidation-reduction reaction in an anode and a cathode.

Advantageous Effects of Disclosure

According to the present disclosure, a method for producing a cell structure that can inhibit a decrease in the efficiency of oxidation-reduction reaction in an anode and a cathode, can be provided.

DESCRIPTION OF EMBODIMENTS OF INVENTION

First, contents of embodiments of the present invention will be listed for description.

(1) A method for producing a cell structure according to an embodiment of the present invention includes: a first step of preparing a cathode material, a solid electrolyte material having proton conductivity, and an anode material; a second step of laminating a layer containing the anode material and a layer containing the solid electrolyte material to obtain a first laminated body, and firing the obtained laminated body to form a joined body of an anode and a solid electrolyte layer; and a third step of laminating a layer containing the cathode material on a surface of the solid electrolyte layer to obtain a second laminated body, and firing the obtained second laminated body to form a cathode. The anode material contains a metal oxide Ma1 and a nickel compound. The metal oxide Ma1 contains an element A1, an element B1, an element M1, and oxygen as constituent elements. The metal oxide Ma1 is a metal oxide having a perovskite structure represented by formula (I):

$$A1_{x1}B1_{1-y1}M1_{y1}O_{3-\delta} \quad (I)$$

(wherein: A1 is at least one element selected from the group consisting of barium, calcium, and strontium; B1 is at least one element selected from the group consisting of cerium and zirconium; M1 is at least one element selected from the group consisting of yttrium, ytterbium, erbium, holmium, thulium, gadolinium, indium, and scandium; x1 is a number that satisfies $0.85 \leq x1 \leq 0.99$; y1 is a number that satisfies $0 < y1 \leq 0.5$; and $\delta$ is an oxygen deficiency amount). In the anode in the cell structure obtained by this method, oxidation reaction of fuel or gas efficiently proceeds. Thus, in the case where the cell structure obtained by this method is applied to a fuel cell, the fuel cell can exhibit high power generation efficiency.

(2) In the formula (I), the x1 is preferably a number that satisfies $0.85 \leq x1 \leq 0.96$. This is because an amount of a specific by-product is further reduced.

(3) In the formula (I), preferably, the A1 contains barium, the B1 contains zirconium, and the M1 contains yttrium. This is because the effect of reducing the content of the specific by-product further improves and the durability of the cell structure also improves.

(4) A method for producing a cell structure according to another embodiment of the present invention includes: a first step of preparing a cathode material, a solid electrolyte material having proton conductivity, and an anode material; a second step of laminating a layer containing the anode material and a layer containing the solid electrolyte material to obtain a first laminated body, and firing the obtained first laminated body to form a joined body of an anode and a solid electrolyte layer; and a third step of laminating a layer containing the cathode material on a surface of the solid electrolyte layer to obtain a second laminated body, and firing the obtained second laminated body to form a cathode. The anode material contains a metal oxide Ma2, a compound Ma3, and a nickel compound. The metal oxide Ma2 contains an element A1, an element B1, an element M1, and oxygen as constituent elements. The metal oxide Ma2 is a metal oxide having a perovskite structure represented by formula (II):

$$A1_{x2}B1_{1-y2}M1_{y2}O_{3-\delta} \quad (II)$$

(wherein: A1 is at least one element selected from the group consisting of barium, calcium, and strontium; B1 is at least one element selected from the group consisting of cerium and zirconium; M1 is at least one element selected from the group consisting of yttrium, ytterbium, erbium, holmium, thulium, gadolinium, indium, and scandium; x2 is a number that satisfies $0.99 \leq x2 \leq 1$; y2 is a number that satisfies $0 < y2 \leq 0.5$; and $\delta$ is an oxygen deficiency amount). The compound Ma3 does not contain the element A1 and contains at least one of the element B1 and the element M1. Also in the anode in the cell structure obtained by this method, oxidation reaction of fuel or gas efficiently proceeds. Thus, in the case where the cell structure obtained by this method is applied to a fuel cell, the fuel cell can exhibit high power generation efficiency.

(5) From the same viewpoint as in the above (3), in the formula (II), preferably, the A1 contains barium, the B1 contains zirconium, and the M1 contains yttrium. In this case, the compound Ma3 preferably contains zirconium dioxide doped with yttrium.

(6) The method for producing the cell structure may further include a fourth step of disposing an oxidant passage for supplying an oxidant to the cathode and disposing a fuel passage for supplying fuel to the anode, after the third step. The cell structure obtained by the method further including the fourth step has high power generation efficiency.

DETAILS OF EMBODIMENTS OF INVENTION

Hereinafter, specific examples of embodiments of the present invention will be specifically described with reference to the drawings as appropriate. The present invention is not limited to these examples and is indicated by the claims, and is intended to include meaning equivalent to the claims and all modifications within the scope of the claims.

1. Cell Structure

In the present embodiment, a cell structure 1 includes, for example, a cathode 2, an anode 3, and a solid electrolyte layer 4 that is interposed between the cathode 2 and the anode 3 and that has proton conductivity, as shown in FIG. 1. The anode 3 and the solid electrolyte layer 4 are integrated by firing to form an electrolyte layer-anode joined body 5. In the illustrated example, a laminated cell structure is shown, but the shape of the cell structure is not limited to the illustration. The shape of the cell structure may be a cylindrical shape obtained by rolling up the cell structure with the anode 3 located at the inner side so as to have a hollow space.

In the cell structure 1 shown in FIG. 1, the thickness of the anode 3 is larger than that of the cathode 2. Thus, the anode 3 serves as a support that supports the solid electrolyte layer 4 (as a result, the cell structure 1). The thickness of the anode 3 may not necessarily be larger than the thickness of the cathode 2. For example, the thickness of the anode 3 and the thickness of the cathode 2 may be substantially the same.

[Anode]

In the anode, reaction (oxidation reaction) in which fuel such as hydrogen is oxidized to release proton and electron takes place. The anode contains a sintered body of a nickel compound and a metal oxide having a perovskite structure ($ABO_3$ phase). The anode has a porous structure. A portion of a B site in the $ABO_3$ phase is substituted with a dopant. Thus, the $ABO_3$ phase exhibits proton conductivity. Hereinafter, an element that occupies an A site in the $ABO_3$ phase is also referred to as "element A".

The anode is formed by performing the following operation. First, the material of the $ABO_3$ phase and the nickel compound are mixed to obtain a mixture. Next, the obtained mixture is fired to obtain an anode. During the firing, the element A and nickel (Ni) contained in the mixture react with each other, thereby generating a low-melting-point compound. Examples of the low-melting-point compound include $BaNiO_2$, but are not particularly limited thereto. The low-melting-point compound forms a liquid phase during the firing. The liquid phase promotes sintering of the mixture containing the material of the $ABO_3$ phase and the nickel compound. Meanwhile, when the liquid phase reacts with the dopant, a by-product containing the element A and the dopant is generated. Examples of the by-product include $BaY_2NiO_5$, but are not particularly limited thereto. The by-product easily decomposes in an atmosphere during operation of a fuel cell, a gas decomposing device, or the like. The by-product is decomposed to generate a decomposition product in the anode. Examples of the decomposition product include $Ba(OH)_2$ and $BaCO_3$, but are not particularly limited thereto. The decomposition product blocks voids of the anode, thereby limiting the oxidation reaction in the anode.

In the present embodiment, by decreasing the proportion of the element A contained in the material of the $ABO_3$ phase, the amount of the by-product generated during the firing is reduced. Hereinafter, the by-product generated during the firing is also referred to as "specific by-product".

Examples of a method for decreasing the proportion of the element A contained in the material of the $ABO_3$ phase include the following two methods.

In the first method, a metal oxide having a perovskite structure having a low proportion of the element A (A1) is used as the material of the $ABO_3$ phase. Specifically, as the material of the $ABO_3$ phase, a metal oxide Ma1 is used which has a perovskite structure represented by formula (I):

$$A1_{x1}B1_{1-y1}M1_{y1}O_{3-\delta} \qquad (I)$$

(wherein: A1 is at least one element selected from the group consisting of barium (Ba), calcium (Ca), and strontium (Sr); B1 is at least one element selected from the group consisting of cerium (Ce) and zirconium (Zr); M1 is at least one element selected from the group consisting of yttrium (Y), ytterbium (Yb), erbium (Er), holmium (Ho), thulium (Tm), gadolinium (Gd), indium (In), and scandium (Sc); $0.85 \leq x1 \leq 0.99$; $0 < y1 \leq 0.5$; and $\delta$ is an oxygen deficiency amount).

In other words, a cell structure obtained by the first method includes a cathode, an anode, and a solid electrolyte layer that is interposed between the cathode and the anode and that has proton conductivity, and the anode includes a sintered portion obtained by firing a mixture of a nickel compound and a metal oxide Ma1 having a perovskite structure represented by formula (I):

$$A1_{x1}B1_{1-y1}M1_{y1}O_{3-\delta} \qquad (I)$$

(wherein: A1 is at least one element selected from the group consisting of Ba, Ca, and Sr; B1 is at least one element selected from the group consisting of Ce and Zr; M1 is a at least one element selected from the group consisting of Y, Yb, Er, Ho, Tm, Gd, In, and Sc; x1 is a number that satisfies $0.85 \leq x1 \leq 0.99$; y1 is a number that satisfies $0 < y1 \leq 0.5$; and $\delta$ is an oxygen deficiency amount).

In formula (I), the "ratio of the number of atoms of the A1 to the sum of the number of atoms of the B1 and the number of atoms of the M1" is a value equal to the value of a number of atoms x1 of the A1 on the basis of the following equation:

$$x1/[(1-y1)+y1]=x1.$$

Therefore, hereinafter, the "ratio of the number of atoms of the A1 to the sum of the number of atoms of the B1 and the number of atoms of the M1" is sometimes indicated merely as "x1".

In the metal oxide Ma1, x1 in formula (I) is a number that satisfies $0.85 \leq x1 \leq 0.99$. By firing the mixture of the metal oxide Ma1 and the nickel compound, reaction between the element A1 and the nickel compound is inhibited. As a result, generation of a liquid phase containing a reaction product of the element A1 and the nickel compound is inhibited, and thus the amount of the specific by-product contained in the obtained anode is reduced.

From the viewpoint that the amount of the by-product generated can be further reduced, x1 is preferably not greater than 0.98 and more preferably not greater than 0.96. From the viewpoint of improving sinterability, x1 is preferably not less than 0.86 and more preferably not less than 0.88. From the viewpoint of improving proton conductivity, y1 is preferably not less than 0.1 and more preferably not less than 0.12. From the viewpoint of improving proton conductivity, y1 is preferably not greater than 0.25 and more preferably not greater than 0.20. As the metal oxide Ma1, two or more types of metal oxides Ma1 at least either the x1s or the y1s of which are different from each other may be used in combination.

In the second method, as the material of the $ABO_3$ phase, a metal oxide Ma2 having a perovskite structure represented by formula (II):

$$A1_{x2}B1_{1-y2}M1_{y2}O_{3-\delta} \qquad (II)$$

(wherein: A1 is at least one element selected from the group consisting of Ba, Ca, and Sr; B1 is at least one element selected from the group consisting of Ce and Zr; M1 is at least one element selected from the group consisting of Y, Yb, Er, Ho, Tm, Gd, In, and Sc; x2 is a number that satisfies $0.99 \leq x2 \leq 1$; y2 is a number that satisfies $0 < y2 \leq 0.5$; and $\delta$ is an oxygen deficiency amount), and a compound Ma3 that does not contain the element A1 and that contains at least one of the element B1 and the element M1, are used.

In other words, a cell structure obtained by the second method includes a cathode, an anode, and a solid electrolyte layer that is interposed between the cathode and the anode and that has proton conductivity, and the anode includes a sintered portion obtained by firing a mixture containing a metal oxide Ma2 having a perovskite structure represented by formula (II):

$$A1_{x2}B1_{1-y2}M1_{y2}O_{3-\delta} \qquad (II)$$

(wherein: A1 is at least one element selected from the group consisting of Ba, Ca, and Sr; B1 is at least one element selected from the group consisting of Ce and Zr; M1 is at least one element selected from the group consisting of Y, Yb, Er, Ho, Tm, Gd, In, and Sc; x2 is a number that satisfies $0.99 \leq x2 \leq 1$; y2 is a number that satisfies $0 < y2 \leq 0.5$; and $\delta$ is an oxygen deficiency amount), a compound Ma3 that does not contain the element A1 and that contains at least one of the element B1 and the element M1, and a nickel compound.

The compound Ma3 does not contain the element A1. Therefore, reaction between the element A1 and the nickel compound during firing of the metal oxide Ma2, the compound Ma3, and the nickel compound is inhibited. As a result, generation of a liquid phase containing a reaction product of the element A1 and the nickel compound is inhibited, and the amount of the specific by-product contained in the obtained anode is reduced.

The compound Ma3 does not have a perovskite structure. However, when the compound Ma3 is fired together with the metal oxide Ma2, the element forming the compound Ma3 contributes to formation of an $ABO_3$ phase. That is, due to the firing, an $ABO_3$ phase that contains each element contained in the metal oxide Ma2 and the compound Ma3 and that has a composition ratio different from that of the metal oxide Ma2 is generated.

The compound Ma3 may be selected as appropriate in accordance with the type of each of the elements A1, B1, and M1. The compound Ma3 is not particularly limited, as long as the compound Ma3 is a compound that does not contain the element A1 and that contains at least one of the element B1 and the element M1. In addition, as the compound Ma3, a compound that does not contain the element A1 and the element M1 and that contains the element B1, and a compound that does not contain the element A1 and the element B1 and that contains the element M1, may be used in combination. Examples of the compound Ma3 includes zirconium dioxide doped with yttrium (hereinafter, also referred to as "YSZ"), zirconium oxide, cerium oxide, yttrium oxide, ytterbium oxide, holmium oxide, and erbium oxide. In the case where the element A1 contains Ba, the element B1 contains Zr, and the element M1 contains Y in the metal oxide Ma2, YSZ is preferably used as the compound Ma3. This is because generation of a phase that is a phase other than the $ABO_3$ phase and that does not have proton conductivity is easily inhibited.

The metal oxide Ma2 and the compound Ma3 may be mixed such that the ratio (hereinafter, also referred to as "ratio x3") of the element A1 to the sum of the element B1 and the element M1 contained in these compounds is a number that satisfies $0.85 \leq x3 \leq 0.99$. The ratio x3 is preferably not greater than 0.98 and more preferably not greater than 0.96, and is preferably not less than 0.86 and more preferably not less than 0.88. The second method is preferable since adjustment of the ratio x3 is easy.

The ratio (hereinafter, also referred to as "ratio x") of the element A1 to the sum of the element B1 and the element M1 in the $ABO_3$ phase after firing can be less than the ratios x1 to x3. The ratio x can be a number that satisfies $0.83 \leq x \leq 0.98$. The ratio (hereinafter, also referred to as "ratio y") of the element M1 to the sum of the element B1 and the element M1 in the $ABO_3$ phase after firing can be less than ratios y1 and y2 and a ratio y3 of the element M1 in the case where the sum of the element B1 and the element M1 contained in the metal oxide Ma2 and the compound Ma3 is set as 1. The ratio y can be, for example, a number that satisfies $0 < y \leq 0.25$.

In formulas (I) and (II), the A1 is at least one element selected from the group consisting of Ba, Ca, and Sr. Among these elements, from the viewpoint of proton conductivity, the A1 preferably contains Ba and is more preferably composed of only Ba. The proportion of Ba in the A1 is preferably not less than 50 atom % and more preferably not less than 80 atom %.

In formulas (I) and (II), the B1 is at least one element selected from the group consisting of Ce and Zr. Among these elements, from the viewpoint of durability, the B1 preferably contains Zr and is more preferably composed of only Zr. The proportion of Zr in the B1 is preferably not less than 50 atom % and more preferably not less than 80 atom %.

In formulas (I) and (II), the M1 is at least one element selected from the group consisting of Y, Yb, Er, Ho, Tm, Gd, In, and Sc. The element M1 is a dopant. The metal oxide having a perovskite structure causes oxygen deficiency due to the element M1, and thus exhibits proton conductivity. Among these elements, from the viewpoint of proton conductivity, in formulas (I) and (II), the M1 preferably contains at least one of Y and Yb and is more preferably composed of only Y. From the viewpoint of proton conductivity, the proportion of Y and Yb in the M1 is preferably not less than 50 atom % and more preferably not less than 80 atom %, as the sum of Y and Yb.

In the case where the A1 contains Ba and the M1 contains Y in formulas (I) and (II), $BaY_2NiO$ can be generated as a by-product during firing with the nickel compound. The by-product particularly easily decomposes. However, according to the present embodiment, generation of $BaY_2NiO_5$ is inhibited even in the case where the metal oxide Ma1 or Ma2 contains Ba and Y.

In formulas (I) and (II), the oxygen deficiency amount δ can be determined in accordance with the amount of the element M1, and satisfies, for example, $0 \leq \delta \leq 0.15$. The proportion of each element in the metal oxides Ma1 and Ma2 can be obtained, for example, by using a reference intensity ratio (hereinafter, also referred to as "RIR") method with X-ray diffraction (hereinafter, also referred to as "XRD").

In consideration of balance between coefficient of linear expansion and power generation efficiency, the content of the nickel compound in the mixture is preferably not less than 40 mass % and more preferably not less than 60 mass %, and is preferably not greater than 90 mass %.

Examples of the nickel compound includes, but not particularly limited thereto, nickel oxides, nickel hydroxides, nickel salts (nickel inorganic acid salts such as nickel carbonate), and nickel halides. Among these compounds, nickel oxides such as NiO are preferable in terms of cost. These nickel compounds may be used singly, or two or more of these nickel compounds may be used in combination.

The thickness of the anode can be determined as appropriate, for example, in the range of 10 μm to 2 mm. The thickness of the anode may be 10 μm to 100 μm. As in the illustrated example, the thickness of the anode may be increased to cause the anode to serve as a support that supports the solid electrolyte layer. In this case, the thickness of the anode can be selected as appropriate from the range of 100 μm to 2 mm.

The sintered portion may occupy at least a portion of the anode. The entire anode may be composed of the sintered portion. Among such cases, when the thickness of the anode is less than 30 μm, from the viewpoint of power generation efficiency, the entire anode is preferably composed of the sintered portion. In addition, when the thickness of the anode is not less than 30 μm, from the viewpoint of power generation efficiency, a region from the interface between the solid electrolyte layer and the anode to at least 30 μm is preferably occupied by the sintered portion. For example, in the case where a first region in which almost no nickel (Ni) is contained, a second region in which a very small amount of Ni is contained, and a third region in which the Ni content rapidly increases as compared to that in the second region are present in this order in a direction from the solid electrolyte layer to the anode, the interface between the solid electrolyte layer and the anode is the boundary between the second region and the third region. The second region is a part of the solid electrolyte layer and is a region containing a very small amount of Ni diffusing from the anode.

The material that forms the region in the anode other than the sintered portion is not particularly limited. Examples of the material include the following compound, metal oxides, and mixture, but are not particularly limited thereto.

Nickel compound alone.
Metal oxide Ma1 alone.
One metal oxide other than the metal oxide Ma1.
One metal oxide other than the metal oxide Ma2.
Mixture of the nickel compound and the "metal oxide other than the metal oxide Ma1" or "the metal oxide other than the metal oxide Ma2".

The metal oxide other than the metal oxide Ma1 is not particularly limited, and may be the metal oxide Ma2 or may be a later-described metal oxide Me, for example. Examples of the metal oxide other than the metal oxide Ma2 include aluminium oxide ($Al_2O_3$) and magnesium oxide (MgO), but are not particularly limited thereto.

When gas containing a gas that decomposes to generate hydrogen, such as ammonia, methane, and propane, is introduced to the anode, decomposition reaction of the gas takes place in the anode to generate hydrogen. That is, the cell structure includes gas decomposition performance. Therefore, it is possible to use the cell structure in a gas decomposing device.

For example, by decomposition of ammonia, hydrogen gas ($H_2$) and nitrogen gas ($N_2$) are generated. The generated hydrogen gas is oxidized by the anode. Accordingly, proton is generated. The generated proton moves through the solid electrolyte layer to the cathode. Meanwhile, the nitrogen gas is discharged as exhaust gas from a later-described gas outlet. The anode may contain a catalyst having a function to decompose the gas. Examples of a catalyst having a function to decompose gas such as ammonia include a compound containing at least one catalyst component selected from the group consisting of iron (Fe), cobalt (Co), titanium (Ti), molybdenum (Mo), tungsten (W), manganese (Mn), ruthenium (Ru), and copper (Cu).

[Solid Electrolyte Layer]

The solid electrolyte layer contains the metal oxide Me having proton conductivity. The solid electrolyte layer transfers proton generated in the anode to the cathode.

The solid electrolyte layer, together with the cathode and the anode, forms the cell structure. A first laminated body is obtained by laminating a layer containing an anode material and a layer containing a solid electrolyte material. A joined body of the anode and the solid electrolyte layer (hereinafter, also referred to as "electrolyte layer-anode joined body") is formed by firing the obtained first laminated body. At this time, nickel (Ni) may diffuse from the anode to the solid electrolyte layer and react with the metal oxide Me in the solid electrolyte layer to generate the specific by-product also in the solid electrolyte layer. When the by-product contained in the solid electrolyte layer decomposes to generate a decomposition product, the resistance of the solid electrolyte layer easily becomes high. Furthermore, when the decomposition product is generated at the interface between the solid electrolyte layer and the cathode, voids of the cathode are blocked and reduction reaction in the cathode is limited. Diffusion of Ni occurs due to entry of the liquid phase containing the reaction product of the element A1 and the nickel compound into the solid electrolyte layer. However, in the case where the ratio of the element A1 to the sum of the element B1 and the element M1 contained in the anode is low, the liquid phase becomes less likely to be formed. Thus, diffusion of Ni to the solid electrolyte layer becomes less likely to occur. Therefore, the amount of the by-product generated in the solid electrolyte layer (specifically, in the vicinity of a main surface of the solid electrolyte layer on which the cathode is laminated) is also reduced. Such an electrolyte layer-anode joined body and cell structure are excellent in oxidation-reduction reaction, and thus are particularly suitable for a fuel cell.

As the metal oxide Me, publicly known materials that have proton conductivity and that are used as a solid electrolyte can be used. Among these materials, from the viewpoint of having excellent proton conductivity, preferable examples of the metal oxide Me include a compound having a perovskite crystal structure represented by formula (III):

$$A2_{x4}B2_{1-y4}M2_{y4}O_{3-\delta} \quad (III)$$

(wherein: A2 is at least one element selected from the group consisting of Ba, Ca, and Sr; B2 is at least one element selected from the group consisting of Ce and Zr; M2 is at least one element selected from the group consisting of Y, Yb, Er, Ho, Tm, Gd, In, and Sc; x4 is a number that satisfies $0.85 \leq x4 \leq 1$; y4 is a number that satisfies $0 < y4 \leq 0.5$; and $\delta$ is an oxygen deficiency amount).

In formula (III), examples of the A2 include the metal elements listed as examples of the A1. Among these metal elements, from the viewpoint of improving proton conductivity, the A2 preferably contains Ba in the above range of the proportion. In formula (III), examples of the B2 include the metal elements listed as examples of the B1. Among these metal elements, from the viewpoint of improving durability, the B2 preferably contains Zr in the above range of the proportion. Examples of the M2 include the metal elements listed as examples of the M1. Among these metal elements, from the viewpoint of improving proton conductivity, the M2 preferably contains at least one of Y and Yb in the above range of the proportion, and is more preferably composed of only Y. From the viewpoint of making coefficients of linear expansion close to each other (coincide) and from the viewpoint of favorable mutual diffusion of metal elements, the metal oxide Me and the metal oxide Ma1 or Ma2 preferably contain the same metal element.

In the metal oxide Me, the ratio (hereinafter, also referred to as "ratio x4") of the element A2 to the sum of the element B2 and the element M2 is preferably a number that satisfies $0.90 \leq x4 \leq 1$, since the resistance is easily reduced. From the viewpoint of improving proton conductivity, y4 is preferably not less than 0.1 and more preferably not less than 0.15, and is preferably not greater than 0.25 and more preferably not greater than 0.2.

The solid electrolyte layer can contain a component other than the metal oxide Me. The content of the component other than the metal oxide Me in the solid electrolyte layer is preferably low from the viewpoint of improving proton conductivity. For example, the metal oxide Me is preferably contained in an amount not less than 50 mass % or not less than 70 mass % of the solid electrolyte layer. Examples of the component other than the metal oxide Me include compounds publicly known as a solid electrolyte, but are not particularly limited thereto. The compounds publicly known as a solid electrolyte also include compounds that do not have proton conductivity.

The thickness of the solid electrolyte layer is, for example, preferably not less than 1 μm and more preferably not less than 3 μm, and is preferably not greater than 50 μm and more preferably not greater than 20 μm. In the case where the thickness of the solid electrolyte layer falls within such a range, the resistance of the solid electrolyte layer is reduced to be low.

[Cathode]

The cathode adsorbs oxygen molecules, and dissociates and ionizes the oxygen molecule into oxygen atoms. The cathode has a porous structure. In the cathode, reaction (reduction reaction of oxygen) between oxide ion and proton transferred through the solid electrolyte layer takes place. The oxide ion is generated by dissociation of an oxidant (oxygen) introduced from a later-described oxide passage.

Examples of the material of the cathode include publicly known materials that are used as a cathode of a fuel cell or a gas decomposing device. Among these materials, the material of the cathode is preferably a metal oxide Mc having a perovskite crystal structure. Specific examples of the metal oxide Mc include lanthanum strontium cobalt ferrite (hereinafter, also referred to as "LSCF"; $La_{1-a}Sr_aCO_{1-b}Fe_bO_{3-\delta}$, "a" is a number that satisfies $0<a<1$, "b" is a number that satisfies $0<b<1$, $\delta$ is an oxygen deficiency amount), lanthanum strontium manganite (hereinafter, also referred to as "LSM"; $La_{1-c}Sr_cMnO_{3-\delta}$, "c" is a number that satisfies $0<c<1$, $\delta$ is an oxygen deficiency amount), lanthanum strontium cobaltite (hereinafter, also referred to as "LSC"; $La_{1-d}Sr_dCoO_{3-\delta}$, "d" is a number that satisfies $0<d<1$, $\delta$ is an oxygen deficiency amount), and samarium strontium cobaltite (hereinafter, also referred to as "SSC"; $Sm_{1-e}Sr_eCoO_{3-\delta}$, "e" is a number that satisfies $0<e<1$, $\delta$ is an oxygen deficiency amount).

The cathode may contain a catalyst such as Ag and Pt. This is because reaction between proton and the oxidant is promoted. In the case where the cathode contains a catalyst, the cathode can be formed by mixing the catalyst and the material of the cathode and sintering the obtained mixture. In addition, the thickness of the cathode is not particularly limited, but may be about 10 μm to 30 μm.

2. Method for Producing Cell Structure

The above-described cell structure is produced, for example, by a method including: a first step of preparing a cathode material, a solid electrolyte material having proton conductivity, and an anode material; a second step of laminating a layer containing the anode material and a layer containing the solid electrolyte material to obtain a first laminated body, and firing the obtained laminated body to form a joined body of an anode and a solid electrolyte layer; and a third step of laminating a layer containing the cathode material on a surface of the solid electrolyte layer to obtain a second laminated body, and firing the obtained second laminated body to form a cathode. Hereinafter, each step will be described in detail.

(First Step)

In the first step, the cathode material, the solid electrolyte material, and the anode material are prepared.

Each of the metal oxides Ma1, Ma2, and Me, which are used for the solid electrolyte material and the anode material, can be produced as follows. The metal oxide Ma1 can be produced by: mixing a material containing the element A1, the element B1, and the element M1, which are constituent elements, at such a ratio that the proportion of each element satisfies the composition of formula (I) described above; and firing the obtained mixture. The metal oxide Ma2 can be produced by: mixing a material containing the element A1, the element B1, and the element M1, which are constituent elements, at such a ratio that the proportion of each element satisfies the composition of formula (II) described above; and firing the obtained mixture. The metal oxide Me can be produced by: mixing a material containing the element A2, the element B2, and the element M2, which are constituent elements, at such a ratio that the proportion of each element satisfies the composition of formula (III) described above; and firing the obtained mixture. Examples of the materials include oxides and carbonates. Among these materials, barium oxide, barium carbonate, or the like is preferably used as an element A1 source or an element A2 source. Zirconium oxide, cerium oxide, or the like is preferably used as an element B1 source or an element B2 source. An oxide such as yttrium oxide and ytterbium oxide is preferably used as an element M1 source or an element M2 source. The firing temperature is, for example, preferably not lower than 1200° C. and more preferably not lower than 1400° C., and is preferably not higher than 1600° C. and more preferably not higher than 1500° C. The firing can be performed in an oxygen atmosphere such as in the atmosphere.

[Solid Electrolyte Material]

The solid electrolyte material is a material for forming the solid electrolyte layer. The solid electrolyte material contains the metal oxide Me.

[Anode Material]

The anode material is a material for forming the anode. The anode material contains a mixture of the metal oxide Ma1 and the nickel compound, or contains a mixture of the metal oxide Ma2, the compound Ma3, and the nickel compound. The content of the nickel compound in the mixture is preferably not less than 40 mass % and more preferably not less than 50 mass %, and is preferably not greater than 90 mass % and more preferably not greater than 70 mass %. In the case where the sintered portion and the region other than the sintered portion are formed as the anode, a material is prepared in addition to the above-described mixture.

[Cathode Material]

The cathode material is a material for forming the cathode. The cathode material contains the metal oxide Mc.

(Second Step)

In the second step, a layer containing the anode material and a layer containing the solid electrolyte material are laminated to obtain a first laminated body, and the obtained laminated body is fired to form a joined body of an anode and a solid electrolyte layer.

Prior to laminating the layer containing the anode material and the layer containing the solid electrolyte material, from the viewpoint of ensuring formability, preferably, the anode material or the solid electrolyte material and a binder are mixed to prepare a paste, and the anode material or the solid electrolyte material and a dispersion medium are mixed to prepare a slurry. Hereafter, a paste containing the anode material or a slurry containing the anode material is also referred to as "anode dispersion". In addition, a paste containing the solid electrolyte material or a slurry containing the solid electrolyte material is also referred to as "solid electrolyte dispersion". Examples of the binder include publicly known materials that are used for producing ceramic materials, for example, cellulose derivatives (cellulose ether, and the like) such as ethyl cellulose, polymer binders such as vinyl acetate-based resins and acrylic resin, and waxes such as paraffin wax. The concept of the vinyl acetate-based resins also includes saponified products of vinyl acetate-based resins such as polyvinyl alcohol.

The amount of the binder contained in the solid electrolyte dispersion per 100 parts by mass of the metal oxide Me is, for example, preferably not less than 1 part by mass and more preferably not less than 1.5 parts by mass, and is preferably not greater than 20 parts by mass and more preferably not greater than 15 parts by mass. In the case where the anode dispersion is subjected to press-forming, the amount of the binder contained in the anode dispersion per a total amount of 100 parts by mass of the anode dispersion is, for example, preferably not less than 1 part by mass and more preferably not less than 3 parts by mass, and is preferably not greater than 15 parts by mass and more preferably not greater than 10 parts by mass. In addition, in the other cases, the amount of the binder contained in the anode dispersion per a total amount of 100 parts by mass of the anode dispersion is, for example, preferably not less than 1 part by mass and more preferably not less than 1.5 parts by mass, and is preferably not greater than 20 parts by mass and more preferably not greater than 15 parts by mass.

Examples of the dispersion medium include water and organic solvents, but are not particularly limited thereto. Examples of the organic solvents include, but not particularly limited thereto: hydrocarbons such as toluene; alcohols such as ethanol and isopropanol; and carbitols such as butyl carbitol acetate. Furthermore, each dispersion may contain various additives, for example, a surfactant and a deflocculant such as polycarboxylic acid, as necessary.

A method for laminating each layer is not particularly limited, and may be selected as appropriate in accordance with a desired thickness of each layer. For example, in the case where the thickness of each layer is not less than several hundreds of micrometers, each dispersion may be formed by press-forming, tape-forming, or the like, and then formed products of these dispersions may be laminated. In the case where the thickness of each layer is several micrometers to several hundreds of micrometers, each layer may be laminated by applying each dispersion in an overlapping manner by means of screen printing, spray application, spin coating, dip coating, or the like. In addition, each layer may be laminated by a combination of these methods. The solid electrolyte dispersion is normally laminated on the layer containing the anode material, by being applied to the surface of the layer containing the anode material, by a method such as screen printing, spray application, spin coating, and dip coating.

Specifically, in the case of producing an anode support type cell structure as shown in FIG. 1, first, the anode dispersion is formed into a predetermined shape by press-forming. Examples of the predetermined shape include pellet shape, plate shape, and sheet shape. Prior to this forming, the anode dispersion may be granulated, and the obtained granules may be subjected to forming. In addition, as necessary, the obtained granules may be pulverized, and the obtained pulverized material may be subjected to forming.

Next, the solid electrolyte dispersion is applied to a surface of a layer containing the formed anode material (preferably, a surface of a layer containing the metal oxide Ma1 or the metal oxide Ma2, and the compound Ma3) by the above-described method to laminate a layer containing the solid electrolyte material, thereby obtaining the first laminated body. Before the solid electrolyte dispersion is applied, a step of calcining the layer containing the anode material may be carried out. The calcining may be performed at a temperature (e.g., 900 to 1100° C.) lower than the temperature at which the anode material is sintered. By performing the calcining, it becomes easy to apply the solid electrolyte dispersion.

Subsequently, the laminated body is subjected to firing. The firing is performed by heating the obtained first laminated body in an oxygen-containing atmosphere to, for example, 1300 to 1700° C. The content of oxygen in the oxygen-containing atmosphere used for the firing is not particularly limited. For example, the firing may be performed in the atmosphere (oxygen content: about 20 vol %), or may be performed in pure oxygen (oxygen content: 100 vol %). The heating temperature is preferably 1350 to 1600° C. The firing can be performed under normal pressure or under increased pressure.

Before the first laminated body is subjected to the firing, a resin component such as the binder contained in each layer may be removed. That is, after the solid electrolyte dispersion is applied, the obtained first laminated body may be heated in the atmosphere to a relatively low temperature of about 500 to 700° C. thereby to remove the resin component contained in each paste. Thereafter, the firing is performed.

Accordingly, the anode material and the solid electrolyte material are co-sintered. By the firing, an electrolyte layer-anode joined body obtained by integrating the anode and the solid electrolyte layer is formed.

(Third Step)

In the third step, a layer containing the cathode material is laminated on a surface of the solid electrolyte layer of the electrolyte layer-anode joined body to obtain a second laminated body, and the obtained second laminated body is fired to form a cathode. The firing is performed by heating to, for example, 800 to 1100° C. in the same oxygen-containing atmosphere as described above.

The cathode material may be laminated on the surface of the solid electrolyte layer by using a cathode dispersion such as a paste or slurry obtained by mixing the cathode material with a binder or the like, similarly to the above. Examples of a method for laminating the cathode dispersion include the same methods as described above. In the case where the cathode dispersion is subjected to press-forming, the amount of the binder contained in the cathode dispersion per 100 parts by mass of the metal oxide Mc is, for example, preferably not less than 1 part by mass and more preferably not less than 3 parts by mass, and is preferably not greater than 15 parts by mass and more preferably not greater than 10 parts by mass. In the other cases, the amount of the binder contained in the cathode dispersion per 100 parts by mass of the metal oxide Mc is, for example, preferably not less than 1 part by mass and more preferably not less than 1.5 parts by mass, and is preferably not greater than 20 parts by mass and more preferably not greater than 15 parts by mass.

(Fourth Step)

Figure 2:
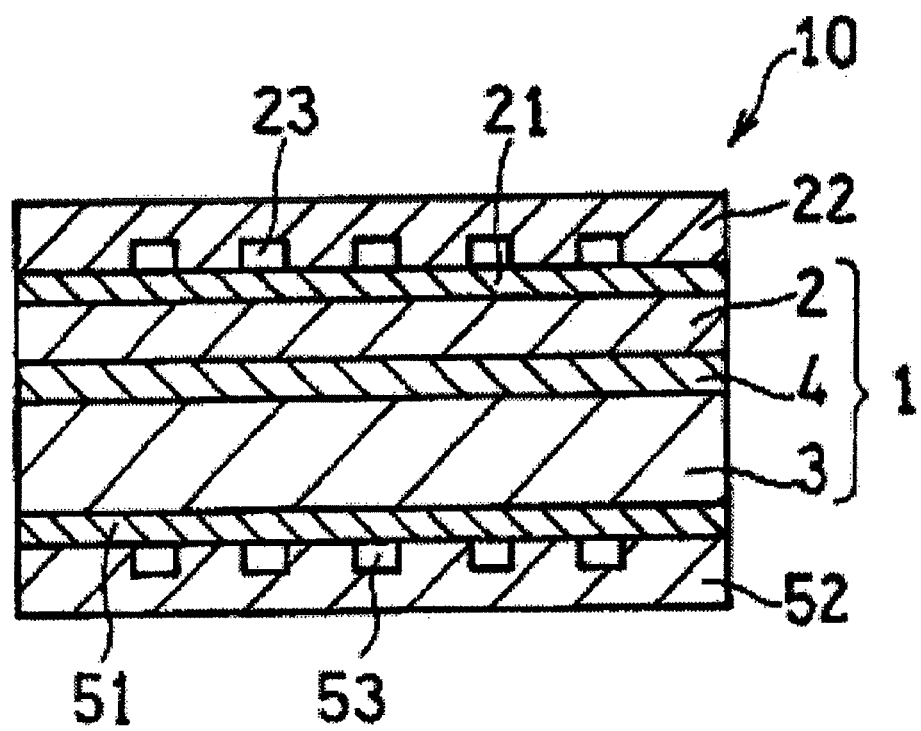
FIG. 2 is a cross-sectional view schematically showing a fuel cell including the cell structure in FIG. 1.

Furthermore, after the third step, a fourth step of disposing an oxidant passage for supplying an oxidant to the cathode and disposing a fuel passage for supplying fuel to the anode may be performed. Such a cell structure is used as a fuel cell. By performing such a step, a cell structure having higher power generation efficiency can be obtained. The fuel cell includes the solid electrolyte layer having proton conductivity, and thus can be operated at a temperature lower than 700° C., preferably in an intermediate temperature range of about 400° C. to 600° C. A cross-section of a fuel cell 10 is schematically shown in FIG. 2.

In the fuel cell 10, an oxidant passage 23 has an oxidant inlet (not shown) into which the oxidant flows, and an oxidant outlet (not shown) from which water generated due to reaction, an unused oxidant, and the like are discharged. Examples of the oxidant include gas containing oxygen. A fuel passage 53 has a gas inlet (not shown) into which fuel gas flows, and a gas outlet (not shown) from which unused fuel, $N_2$ or $CO_2$ generated due to reaction, and the like are discharged.

The oxidant passage 23 may be formed, for example, in a cathode side separator 22 that is disposed at the outer side of the cathode 2. Similarly, the fuel passage 53 may be formed, for example, in an anode side separator 52 that is disposed at the outer side of the anode 3.

In the case where the fuel cell 10 is formed by laminating a plurality of cell structures 1, for example, the cell structure 1, the cathode side separator 22, and the anode side separator 52 are laminated as a single unit. For example, the plurality of cell structures 1 may be connected in series by separators having gas passages (an oxidant passage and a fuel passage) at both surfaces thereof.

Examples of the material of the separators include stainless steel and heat-resistant alloys such as nickel-based alloys and chromium-based alloys, in terms of conductivity and heat resistance. Among these materials, stainless steel is preferable since stainless steel is inexpensive. In a proton-conductive oxide type fuel cell, the operating temperature is about 400° C. to 600° C., and thus stainless steel can be used as the material of the separators.

The fuel cell 10 may further include a current collector. For example, the fuel cell 10 may include a cathode side current collector 21 disposed between the cathode 2 and the cathode side separator 22, and an anode side current collector 51 disposed between the anode 3 and the anode side separator 52. The cathode side current collector 21 performs a function to supply oxidant gas introduced from the oxidant passage 23, to the cathode 2 while diffusing the oxidant gas, in addition to a current collecting function. The anode side current collector 51 performs a function to supply fuel gas introduced from the fuel passage 53, to the anode 3 while diffusing the fuel gas, in addition to a current collecting function. Thus, each current collector is preferably a structure having gas permeability.

Examples of the structure used as each current collector include metal porous bodies, metal meshes, punching metals, and expanded metals containing platinum, silver, a silver alloy, nickel, a Ni alloy, or the like. Among these structures, metal porous bodies are preferable, since metal porous bodies have excellent lightweight properties and gas permeability. In particular, a metal porous body having a three-dimensional network structure is preferable. The three-dimensional network structure refers to a structure in which bar-shaped or fibrous metals that form the metal porous body are three-dimensionally connected to each other to form a network. Examples of the three-dimensional network structure include a sponge-like structure and a nonwoven fabric-like structure.

A metal porous body can be formed, for example, by coating a porous body that has continuous voids and that is formed of a resin, with a metal as described above. When the internal resin is removed after the porous body formed of the resin is coated with the metal, a hollow space is formed within the skeleton of the metal porous body, so that the metal porous body becomes hollow. As a commercially available metal porous body having such a structure, "Celmet" (registered trademark) of nickel manufactured by Sumitomo Electric Industries, Ltd. can be used.

Hereinafter, the present invention will be described in more detail by way of Examples. The present invention is not limited only to the Examples.

Production Example 1

(1) Production of Metal Oxides m1 to m4 ($Ba_{x1}Zr_{1-y1}Y_{y1}O_{3-\delta}$)
Each of metal oxides m1 to m4 represented by formula (VI):

$$Ba_{x1}Zr_{1-y1}Y_{y1}O_{3-\delta} \qquad (VI)$$

was produced by performing the following operation.

First, barium carbonate, zirconium oxide, and yttrium oxide were put into a ball mill and mixed such that a mole ratio was achieved at which x1 in formula (VI) was a value shown in Table 1 and y1 in formula (VI) was 0.200. The obtained mixture was subjected to uniaxial forming to obtain pellets. The obtained pellets were fired at 1300° C. for 10 hours. Accordingly, each of the metal oxides m1 to m4 having a perovskite structure was obtained.

(2) Production of Sintered Bodies S1 to S4
The obtained metal oxide m1 and NiO were mixed with a binder (polyvinyl alcohol), a surfactant (polycarboxylic acid type surfactant), and an adequate amount of ethanol in a ball mill, to prepare a paste-like dispersion. At this time, the metal oxide m1 and NiO were mixed such that the mass ratio (metal oxide/NiO) was 40/60. The dispersion was granulated. The obtained granules were subjected to uniaxial forming under pressure to obtain disc-shaped pellets (diameter: 20 mm). De-binder treatment was performed on the obtained pellets by calcining at 750° C. for 10 hours. The pellets having undergone the de-binder treatment were subjected to firing at 1400° C. for 10 hours to obtain a sintered body S1. In addition, sintered bodies S2 to S4 were obtained by performing the same operation as described above, except that the metal oxides m2 to m4 were used instead of the metal oxide m1. The obtained sintered bodies S1 to S4 were pulverized, and quantitative analysis was performed on the specific by-product ($BaY_2NiO_5$) and the $ABO_3$ phase contained in the sintered bodies S1 to S4 by a RIR method with XRD. The results are shown in Table 1.

TABLE 1

| Sintered body | Metal oxide | x1 | $BaY_2NiO_5$ (mass %) | $ABO_3$ phase (mass %) | Other ($Y_2O_3$) (mass %) |
|---|---|---|---|---|---|
| S1 | m1 | 1.000 | 9.3 | 90.7 | 0 |
| S2 | m2 | 0.985 | 8.4 | 91.6 | 0 |
| S3 | m3 | 0.957 | 4.4 | 90.7 | 4.9 |
| S4 | m4 | 0.892 | 0 | 92.6 | 7.4 |

The sintered bodies S2 to S4 were obtained from the metal oxides m2 to m4 in which x1 in formula (VI) is not greater than 0.99. On the other hand, the sintered body S1 was obtained from the metal oxide m1 in which x1 in formula (VI) exceeds 0.99. From the results shown in Table 1, the sintered bodies S2 to S4 were found to have a lower content of $BaY_2NiO_5$, which is the by-product, than that in the sintered body S. In addition, the sintered bodies S2 to S4 were found to contain the $ABO_3$ phase in an amount equal to or greater than that in the sintered body S1. The sintered bodies S3 and S4 in which the metal oxides m3 and m4 were used contain $Y_2O_3$ instead of $BaY_2NiO_5$, and $Y_2O_3$ is a compound that is hard to decompose and thus is less likely to become an obstacle to oxidation reaction.

Example 1

(1) Preparation of Anode Paste
The metal oxide m1 obtained in Production Example 1 and YSZ were used as the anode material. The metal oxide m1, YSZ, and NiO were mixed with a binder (polyvinyl alcohol), a surfactant (polycarboxylic acid type surfactant), and an adequate amount of ethanol in a ball mill, to prepare a paste-like anode dispersion (anode paste). At this time, the metal oxide m1 and YSZ were mixed at a mole ratio at which the ratio x of the element A1 to the sum of the element B1 and the element M1 in the $ABO_3$ phase was 0.900. In addition, the mixture of the metal oxide m1 and YSZ, and NiO were mixed such that the mass ratio [(sum of metal oxide m1 and YSZ)/(NiO)] was 40/60. The amount of the binder was set to 10 parts by mass per a total amount of 100 parts by mass of the metal oxide m1, YSZ, and NiO. The amount of an additive was set to 0.5 parts by mass per a total amount of 100 parts by mass of the metal oxide m1, YSZ, and NiO. In (1) of Example 1, the metal oxide m1 obtained in Production Example 1 corresponds to the metal oxide Ma2 represented by formula (II). In addition, YSZ corresponds to the Ma3 that does not contain the element A1 and that contains at least one of the element B1 and the element M1.

(2) Preparation of Solid Electrolyte Paste

The metal oxide m1 obtained in Production Example 1 was used as the metal oxide Me forming the solid electrolyte layer. The metal oxide m1, a binder (ethyl cellulose), a surfactant (polycarboxylic acid type surfactant), and an adequate amount of butyl carbitol acetate were mixed to prepare a solid electrolyte paste. The amount of the binder was set to 6 parts by mass per 100 parts by mass of the metal oxide m1. The amount of the surfactant was set to 0.5 parts by mass per 100 parts by mass of the metal oxide m1. In (2) of Example 1, the metal oxide m1 obtained in Production Example 1 corresponds to a compound that has a perovskite crystal structure represented by formula (III) and that is the metal oxide Me forming the solid electrolyte layer.

(3) Preparation of Cathode Paste

LSCF ($La_{0.6}Sr_{0.4}Fe_{0.8}Co_{0.2}O_{3-\delta}$ ($\delta \approx 0.1$)) was used as the metal oxide Mc forming the cathode. Powder of LSCF, a surfactant (polycarboxylic acid type surfactant), and an adequate amount of a solvent (toluene and isopropanol) were mixed to prepare a cathode paste.

(4) Production of Electrolyte Layer-Anode Joined Body

The anode paste obtained in (1) of Example 1 was granulated. The obtained granules were subjected to uniaxial forming under pressure to obtain disc-shaped pellets (diameter: 20 mm). The obtained pellets were calcined at 1000° C. The solid electrolyte paste obtained in (2) of Example 1 was applied to one main surface of each obtained disc-shaped pellet by spin coating, to form a coating film thereon. De-binder treatment was performed on the pellets having the coating films formed thereon, by heating at 750° C. for 10 hours. Next, the pellets having undergone the de-binder treatment were subjected to firing at 1400° C. for 10 hours to obtain an electrolyte layer-anode joined body (hereinafter, also referred to as "joined body A"). When the joined body A was observed with a scanning electron microscope, the thickness of the joined body A was about 1.4 mm. In addition, the thickness of the solid electrolyte layer in the joined body A was 10 μm.

Quantitative analysis was performed on the specific by-product ($BaY_2NiO_5$) and the $ABO_3$ phase contained in the solid electrolyte layer in the obtained electrolyte layer-anode joined body A, by a RIR method with XRD. The results are shown in Table 2.

(5) Production of Cell Structure

The cathode paste obtained in (3) of Example 1 was applied to the surface of the solid electrolyte layer in the joined body A obtained in (4) of Example 1. After the cathode paste was applied, the joined body A was heated at 1000° C. for 2 hours to form a cathode. Accordingly, a cell structure A was obtained. When the cell structure A was observed with a scanning electron microscope, the thickness of the cathode was 10 μm.

The proportion of each element was measured at arbitrary five locations on a cross-section in the thickness direction of the anode in the cell structure A by using energy dispersive X-ray spectroscopy. As a result, the average composition of the entire anode was found to be $Ba_{0.899}Zr_{0.800}Y_{0.200}O_{2.900}$.

(6) Production of Fuel Cell

A current collector formed of a nickel porous body (Celmet, manufactured by Sumitomo Electric Industries, Ltd., thickness: 1 mm, porosity: 95 vol %) was laminated on each of the surfaces of the cathode and the anode of the cell structure A obtained in (5) of Example 1. Furthermore, a cathode side separator having an oxidant passage and formed of stainless steel was laminated on the cathode side current collector. Moreover, an anode side separator having a fuel passage and formed of stainless steel was laminated on the anode side current collector. Accordingly, a fuel cell A shown in FIG. 2 was obtained. One end portion of a lead wire was joined to each current collector. The other end portion of the lead wire was extended out of the fuel cell. In addition, measuring equipment was connected so as to allow measurement of a current value and a voltage value between the respective lead wires.

(7) Power Generation Performance Evaluation

A maximum power density was obtained when an operating temperature was set to 600° C., hydrogen was caused to flow as fuel gas at 100 $cm^3$/min to the anode of the fuel cell A obtained in (6) of Example 1, and air was caused to flow at 300 $cm^3$/min to the cathode of the fuel cell A. The results are shown in Table 3.

Example 2

A joined body B, a cell structure B, and a fuel cell B were obtained by performing the same operation as in Example 1, except that the metal oxide m3 (corresponding to the metal oxide Ma1) was used as the anode material instead of the metal oxide m1 (corresponding to the metal oxide Ma2) and YSZ (corresponding to the compound Ma3). Next, quantitative analysis of the specific by-product ($BaY_2NiO_5$), the $ABO_3$ phase, and $Y_2O_3$ contained in the solid electrolyte layer of the joined body B, and power generation performance evaluation of the fuel cell B were carried out by performing the same operation as in Example 1. The results are shown in Tables 2 and 3.

The proportion of each element was measured at arbitrary five locations on a cross-section in the thickness direction of the anode in the cell structure B by using energy dispersive X-ray spectroscopy. As a result, the average composition of the entire anode was found to be $Ba_{0.955}Zr_{0.800}Y_{0.200}O_{2.900}$.

Comparative Example 1

A joined body a, a cell structure a, and a fuel cell a were obtained by performing the same operation as in Example 1, except that only the metal oxide m1 was used as the anode material. Next, quantitative analysis of the specific by-product ($BaY_2NiO_5$), the $ABO_3$ phase, and $Y_2O_3$ contained in the solid electrolyte layer of the joined body a, and power generation performance evaluation of the fuel cell a were carried out by performing the same operation as in Example 1. The results are shown in Tables 2 and 3.

The proportion of each element was measured at arbitrary five locations on a cross-section in the thickness direction of the anode in the cell structure a by using energy dispersive X-ray spectroscopy. As a result, the average composition of the entire anode was found to be $Ba_{0.998}Zr_{0.800}Y_{0.200}O_{2.900}$.

TABLE 2

| Joined body | Anode material metal oxide | x | $BaY_2NiO_5$ (mass %) | $ABO_3$ phase (mass %) | Other ($Y_2O_3$) (mass %) |
|---|---|---|---|---|---|
| A | m1 + YSZ | 0.900 | 0 | 92.0 | 8.0 |
| B | m3 | 0.957 | 2.9 | 91.8 | 5.3 |
| a | m1 | 1.000 | 6.1 | 91.3 | 2.6 |

TABLE 3

| Fuel cell | x | Maximum power density (mW/cm$^2$) |
|---|---|---|
| A | 0.900 | 165 |
| B | 0.957 | 155 |
| a | 1.000 | 145 |

The joined bodies A and B were produced by using the anode material prepared such that the ratio x was not greater than 0.99. On the other hand, the joined body a was produced by using the anode material in which the ratio x was 1. The joined bodies A and B were found to have a smaller amount of the by-product (BaY$_2$NiO$_5$) contained in the solid electrolyte layer, than that in the joined body a. In addition, the joined bodies A and B were found to have a larger amount of the ABO$_3$ phase than that in the joined body a. Furthermore, the fuel cell A including the joined body A and the fuel cell B including the joined body B were found to have excellent power generation performance since the maximum power densities thereof were higher than that of the fuel cell a including the joined body a.

The cell structure obtained by the method of the present disclosure has a low content of the by-product, which generates a decomposition product that inhibits oxidation-reduction reaction, as described above, and thus is suggested to be suitable for application to a fuel cell such as a proton-conductive oxide type fuel cell.

REFERENCE SIGNS LIST 1 cell structure
2 cathode
3 anode
4 solid electrolyte layer
5 electrolyte layer-anode joined body
10 fuel cell
21, 51 current collector
22, 52 separator
23 oxidant passage
53 fuel passage

The invention claimed is:

1. A method for producing a cell structure, the method comprising:
a first step of preparing a cathode material, a solid electrolyte material having proton conductivity, and an anode material;
a second step of laminating a layer containing the anode material and a layer containing the solid electrolyte material to obtain a first laminated body, and firing the obtained first laminated body to form a joined body of an anode and a solid electrolyte layer; and
a third step of laminating a layer containing the cathode material on a surface of the solid electrolyte layer to obtain a second laminated body, and firing the obtained second laminated body to form a cathode, wherein
anode material contains a metal oxide Ma2, a compound Ma3, and a nickel compound,
the metal oxide Ma2 contains an element A1, an element B1, an element M1, and oxygen as constituent elements,
the metal oxide Ma2 is a metal oxide having a perovskite structure represented by formula (II):

$$A1_{x2}B1_{1-y2}M1_{y2}O_{3-\delta}$$

(wherein: A1 is at least one element selected from the group consisting of barium, calcium, and strontium; B1 is at least one element selected from the group consisting of cerium and zirconium; M1 is at least one element selected from the group consisting of yttrium, ytterbium, erbium, holmium, thulium, gadolinium, indium, and scandium; x2 is a number that satisfies $0.99 < x2 \leq 1$; y2 is a number that satisfies $0 < y2 \leq 0.5$; and $\delta$ is an oxygen deficiency amount),
the compound Ma3 does not contain the element A1 and contains at least one of the element B1 and the element M1, and
in the first step, the metal oxide Ma2 and the compound Ma3 are mixed such that a ratio x3 of the element A1 to the sum of the element B1 and the element M1 is a number that satisfies $0.85 \leq x3 \leq 0.99$.

2. The method for producing the cell structure according to claim 1, wherein
in the formula (II),
the A1 contains barium,
the B1 contains zirconium,
the M1 contains yttrium, and
the compound Ma3 contains zirconium dioxide doped with yttrium.

3. The method for producing the cell structure according to claim 1, further comprising a fourth step of disposing an oxidant passage for supplying an oxidant to the cathode and disposing a fuel passage for supplying fuel to the anode, after the third step.

* * * * *